United States Patent
Vanganuru et al.

(10) Patent No.: US 8,780,749 B2
(45) Date of Patent: *Jul. 15, 2014

(54) METHOD AND APPARATUS FOR ESTIMATING A SIGNAL-TO-INTERFERENCE RATIO

(75) Inventors: Kiran K. Vanganuru, King of Prussia, PA (US); Gregory S. Sternberg, Mt. Laurel, NJ (US); William E. Lawton, Parker Ford, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/361,301

(22) Filed: Jan. 30, 2012

(65) Prior Publication Data

US 2012/0127884 A1 May 24, 2012

Related U.S. Application Data

(63) Continuation of application No. 12/393,309, filed on Feb. 26, 2009, now Pat. No. 8,107,393.

(60) Provisional application No. 61/031,530, filed on Feb. 26, 2008.

(51) Int. Cl.
  *H04W 24/00* (2009.01)
(52) U.S. Cl.
  USPC ........... 370/252; 370/318; 370/335; 370/342; 375/144; 375/147; 375/316; 455/69; 455/115.1; 455/522
(58) Field of Classification Search
  None
  See application file for complete search history.

(56) References Cited

U.S. PATENT DOCUMENTS

| | | | |
|---|---|---|---|
| 5,528,581 A * | 6/1996 | De Bot | 370/203 |
| 6,028,894 A | 2/2000 | Oishi et al. | |
| 6,317,456 B1 | 11/2001 | Sayeed | |
| 6,717,976 B1 * | 4/2004 | Shen | 375/147 |
| 7,076,001 B2 * | 7/2006 | Beadle et al. | 375/316 |
| 7,085,311 B2 | 8/2006 | Iwasaki | |

(Continued)

FOREIGN PATENT DOCUMENTS

| | | |
|---|---|---|
| CN | 1263389 | 8/2000 |
| CN | 1264969 | 8/2000 |

(Continued)

OTHER PUBLICATIONS

Choi et al., "Improved Channel Estimation and SIR Measurement in WCDMA Downlink Systems," IEEE Transactions on Vehicular Technology, vol. 54 No. 2, pp. 525-537 (Mar. 2005).

*Primary Examiner* — Chi Pham
*Assistant Examiner* — Shick Hom
(74) *Attorney, Agent, or Firm* — Volpe and Koenig, P.C.

(57) ABSTRACT

A method and apparatus for estimating a signal-to-interference ratio (SIR) are disclosed. A received signal includes signal energy on multiple basis functions. Desired signal energy in the received signal is transformed onto a first basis function with constant polarity. The desired signal energy is estimated by coherently averaging signal energy on the first basis function. A noise power is estimated by averaging signal energy on each basis function other than the first basis function and accumulating the averaged signal energy from the basis function other than the first basis function and scaling the accumulated signal energy to account for a noise estimate from the first basis function. An SIR is estimated by dividing the desired signal energy by the noise power.

22 Claims, 5 Drawing Sheets

(56) References Cited

U.S. PATENT DOCUMENTS

| | | |
|---|---|---|
| 7,283,510 B2 | 10/2007 | Ito et al. |
| 7,443,827 B2 | 10/2008 | Sano |
| 8,095,168 B2 | 1/2012 | Vanganuru et al. |
| 8,107,393 B2 * | 1/2012 | Vanganuru et al. ............ 370/252 |
| 2004/0071193 A1 * | 4/2004 | Atarashi et al. ................ 375/144 |
| 2006/0092905 A1 * | 5/2006 | Do et al. ........................ 370/342 |
| 2008/0310564 A1 | 12/2008 | Andrews et al. |
| 2008/0310617 A1 * | 12/2008 | Daecke et al. ........... 379/406.08 |

FOREIGN PATENT DOCUMENTS

| | | |
|---|---|---|
| CN | 1349319 | 5/2002 |
| CN | 1479470 | 3/2004 |
| CN | 1756413 | 4/2006 |
| CN | 101102599 | 1/2008 |
| JP | 2002/158621 | 5/2002 |
| JP | 2006067001 A2 | 3/2006 |
| WO | 2004/051902 | 6/2004 |
| WO | 2007/115704 | 10/2007 |

* cited by examiner

METHOD AND APPARATUS FOR ESTIMATING A SIGNAL-TO-INTERFERENCE RATIO

CROSS REFERENCE TO RELATED APPLICATIONS

This application is a continuation of U.S. patent application Ser. No. 12/393,309, filed Feb. 26, 2009, now U.S. Pat. No. 8,107,393, which issued on Jan. 31, 2013, which claims the benefit of U.S. provisional application No. 61/031,530, filed Feb. 26, 2008, which are incorporated by reference as if fully set forth herein.

FIELD OF INVENTION

This application is related to digital communication including wireless communications.

BACKGROUND

In code division multiple access (CDMA) wireless systems, an accurate power control is important to effectively utilize frequency resources that are commonly shared by wireless transmit/receive units (WTRUs) and a base station. A system capacity is increased when the power is optimally controlled because the system capacity is highly related with an amount of interference in the system.

In a wideband code division multiple access (WCDMA) system, a closed-loop power control is employed for transmit power control. The closed-loop power control is based on signal-to-interference ratio (SIR) measurements. A measured SIR is compared to a reference SIR and a transmit power control command is generated based on the SIR comparison. Therefore, the accuracy of the SIR estimation greatly affects the stability and accuracy of the transmit power control and the system capacity. Conventional statistical variance-based estimators need larger number of pilot symbols to make reasonable SIR estimations, which leads to slow response to channel variations. This is especially true in cases that the transmitted number of pilot symbols is small.

SUMMARY

A method and apparatus for estimating a signal-to-interference ratio (SIR) are disclosed. A received signal includes signal energy on multiple basis functions. Desired signal energy in the received signal is transformed onto a first basis function with constant polarity. The desired signal energy is estimated by coherently averaging signal energy on the first basis function. A noise power is estimated by averaging signal energy on each basis function other than the first basis function and accumulating the averaged signal energy from the basis function other than the first basis function and scaling the accumulated signal energy to account for a noise estimate from the first basis function. An SIR is estimated by dividing the desired signal energy by the noise power.

In a WCDMA system, a common pilot channel (CPICH) pilot symbol energy may be transformed to the real part by multiplying complex conjugates of CPICH pilot symbols with the received CPICH pilot symbols, and a CPICH signal power may be estimated from the real part and a CPICH noise power may be estimated from the imaginary part after transformation. A CPICH SIR is then computed by dividing the CPICH signal power by the CPICH noise power.

Dedicated physical control channel (DPCCH) pilot symbol energy may be transformed to the real part and a DPCCH signal power may be computed from the real part of the DPCCH pilot symbols after transformation. The CPICH noise power may be scaled with a scaling factor of a ratio of a CPICH spreading factor and a DPCCH spreading factor. A DPCCH SIR is then computed by dividing the DPCCH signal power by the scaled CPICH noise power.

BRIEF DESCRIPTION OF THE DRAWINGS

A more detailed understanding may be had from the following description, given by way of example in conjunction with the accompanying drawings wherein.

DETAILED DESCRIPTION

Embodiments for post detection measurement of an SIR are disclosed. The disclosed embodiments may be used to accurately measure the SIR for both fading and static channels and are able to track the SIR over a broad range of velocities and digital modulation schemes. The apparatus and methods disclosed herein may be implemented in a WTRU or a base station. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

A digital modulated signal may be represented as a linear combination of a set of orthonormal signal waveforms or basis functions. For example, binary phase shift keying (BPSK) or pulse amplitude modulation (PAM) modulated waveforms may be represented using a single basis function of the form:

$$f_1(t) = \sqrt{\frac{2}{E_g}} g(t)\sin 2\pi f_c t, \quad \text{Equation (1)}$$

wherein $E_g$ represents the energy of the pulse shape, $g(t)$ is the pulse shape and $f_c$ is the carrier frequency.

Similarly, quadrature amplitude modulation (QAM) and M-phase shift keying (MPSK) modulated waveforms may be represented using two basis functions of $$f_1(t) = \sqrt{\frac{2}{E_g}} g(t)\sin 2\pi f_c t \quad \text{Equation (2)}$$

$$f_2(t) = \sqrt{\frac{2}{E_g}} g(t)\cos 2\pi f_c t.$$

The received signal waveform during $k^{th}$ symbol duration may be represented as follows:

$$r_k(t) = \sum_{n=1}^{N} s_{kn} f_n(t) + n(t), \quad \text{Equation (3)}$$

wherein n(t) represents the noise and interference process and N is the number of orthonormal waveforms required to represent the modulated signal and $s_{kn}$ represents the vector projection of the $k^{th}$ transmitted symbol onto the basis function $f_n(t)$.

Figure 1:
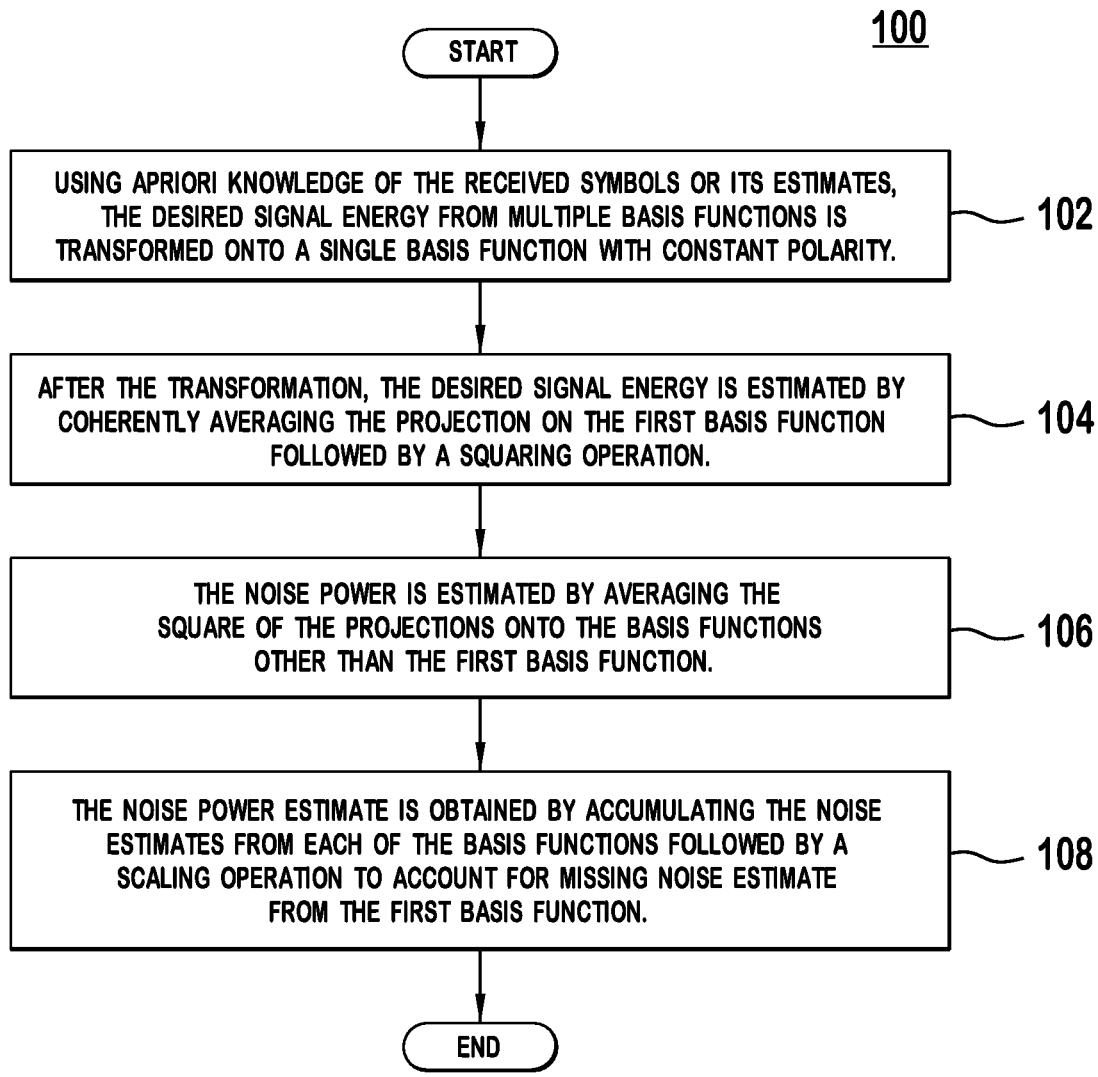
FIG. 1 is a flow diagram of a process for estimating an SIR in accordance with one embodiment.

FIG. 1 is a flow diagram of a process 100 for estimating an SIR in accordance with one embodiment. Using a priori knowledge of the received symbols, (e.g., pilot symbols), or an estimate of the transmitted symbols, (i.e., blind estimate), the desired signal energy from multiple basis functions, (i.e., a set of orthonormal signal waveforms), is transformed onto a single basis function with constant polarity (step 102). Without loss of generality, it is assumed that all the signal energy is projected onto the basis function $f_1(t)$. Under ideal circumstances this transformation would mean that the desired signal is concentrated only on $f_1(t)$ and the projections onto the other basis functions contain pure noise and interference.

After the transformation, the desired signal energy is estimated by coherently averaging the projection on $f_1(t)$ followed by a squaring operation (step 104). The noise power is estimated by averaging the square of the projections onto the basis functions other than $f_1(t)$ (step 106). This would yield an average noise estimate on each of the basis functions other than $f_1(t)$. The final noise power estimate is obtained by accumulating the noise estimates from each of the basis functions followed by a scaling operation to account for missing noise estimate from $f_1(t)$ (step 108).

Figure 2:
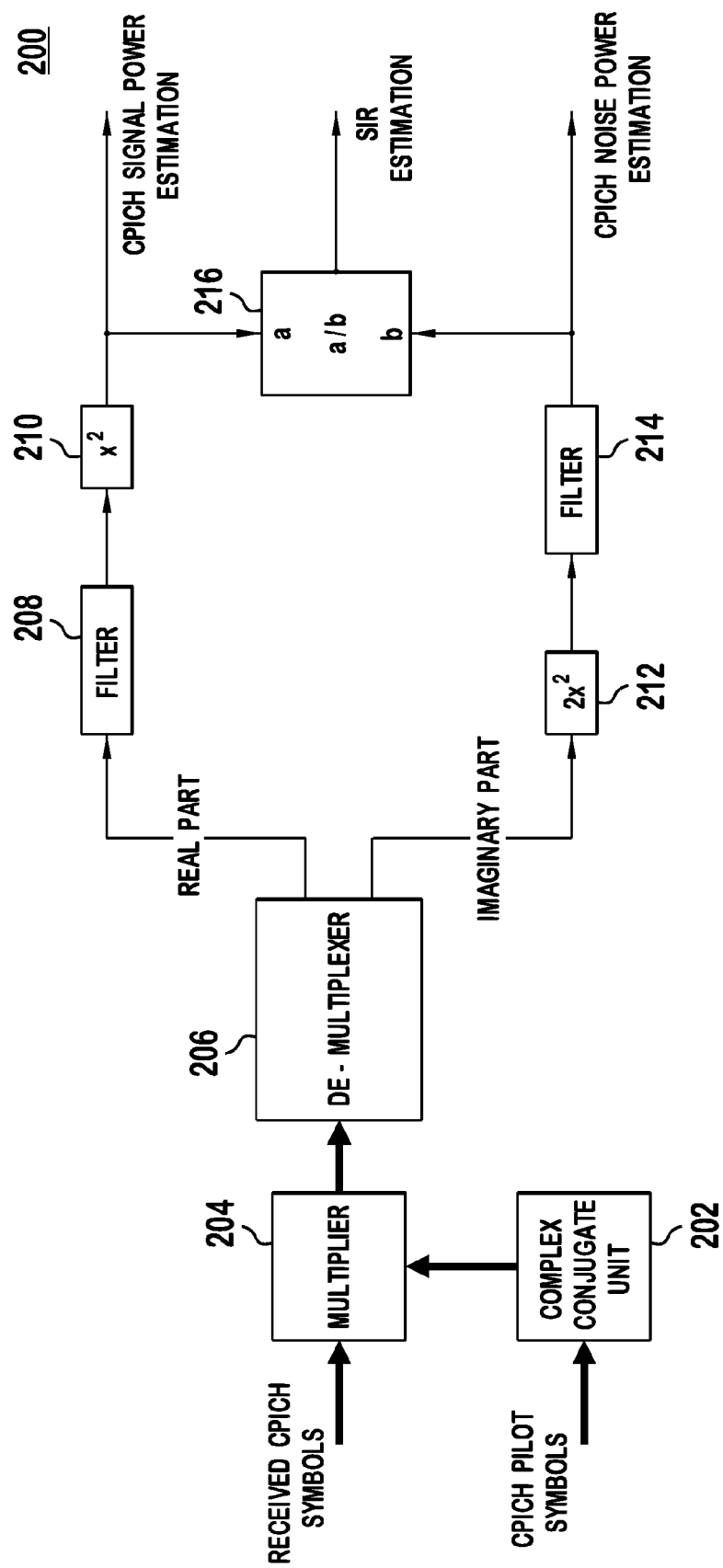
FIG. 2 is a block diagram of an example apparatus for estimating a CPICH SIR for WCDMA in accordance with one embodiment.

FIG. 2 is a block diagram of an example apparatus 200 for estimating a CPICH SIR for WCDMA in accordance with a first embodiment. It should be noted that the estimation of the CPICH SIR in the WCDMA system is provided as an example and the apparatus and method may be used to estimate an SIR on any channel, (e.g., dedicated physical control channel (DPCCH)), for any wireless communication systems.

The apparatus 200 includes a complex conjugate unit 202, a multiplier 204, a de-multiplexer 206, a first filter 208, a first power calculation unit 210, a second power calculation unit 212, a second filter 214, and a divider 216. The apparatus 200 receives a CPICH pilot symbol sequence. The CPICH pilot symbols in WCDMA are quadrature phase shift keying (QPSK) modulated and may be represented in complex notation with real and imaginary components representing the projections of the received signal onto the two basis functions defined by Equation (2). All the signal energy of the CPICH pilot symbols may be transformed onto the real axis by multiplying the received CPICH pilot symbols with the complex conjugates of the CPICH pilot symbols.

A complex conjugate of the CPICH pilot symbols, (i.e., unit phasor), is generated by the complex conjugate unit 202 and multiplied to the received CPICH pilot symbols by the multiplier 204. A real part and an imaginary part are then separated from the multiplication results by the de-multiplexer 206.

After the transformation the desired signal energy is concentrated on the real portion and the imaginary portion contains purely interference under ideal conditions. The real part values are then filtered by the first filter 208. The first power calculation unit 210 calculates the CPICH signal power estimate.

Assuming that a noise is identically distributed between real and imaginary parts, the second power calculation unit 212 squares the imaginary part and then scales it by a factor of 2. The output from the second power calculation unit 212 is then filtered by the second filter 214 to obtain the CPICH noise power estimate. The CPICH SIR is obtained by the divider 216 by dividing the CPICH signal power estimate by the CPICH noise power estimate.

QAM modulation may also be represented with two basis functions similar to QPSK modulation. The apparatus 200 may be used to estimate an SIR of QAM modulated symbols. The transmitted QAM symbols should be either known or estimated a priori. The apparatus 200 may be used to estimate an SIR of the DPCCH using the DPCCH pilot symbols.

Figure 3:
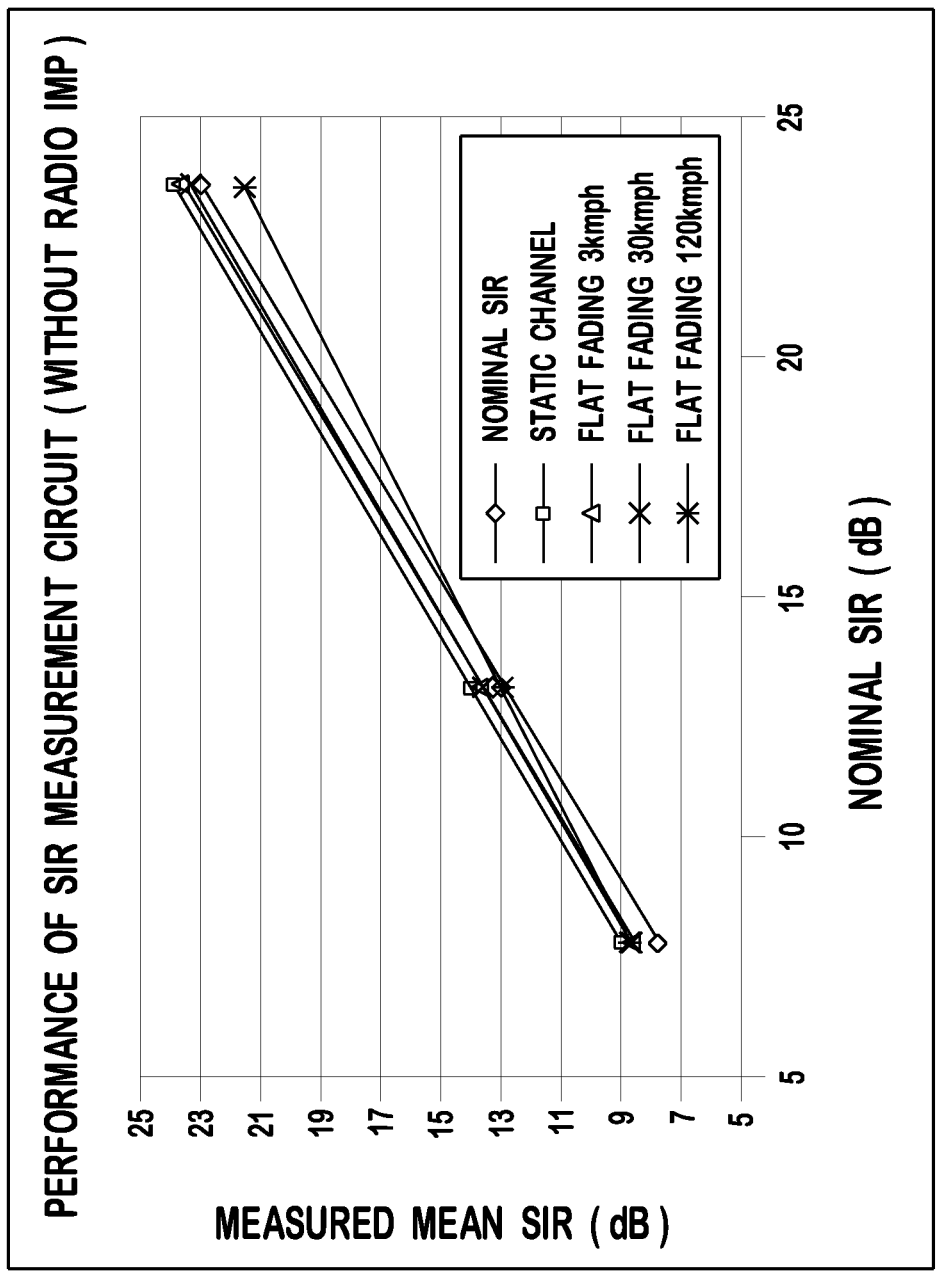
FIG. 3 shows the performance of the CPICH SIR measurement in static and flat fading channel conditions in accordance with a first embodiment.

FIG. 3 shows the performance of the CPICH SIR measurement in static and flat fading channel conditions. These results have been generated with an exponential moving average filter with a pole at 0.996. The results show good agreement both in static and fading conditions over a broad range of SIR values. This SIR estimation method has been found to make reliable estimates for very low SIR values.

One of the main advantages of this approach is the fact that signal energy and noise energy may be measured independently of each other. This allows the usage of a very low bandwidth filter to improve the accuracy of the final estimate. Conventional methods based on statistical variance measurements suffer from severe inaccuracies while using a low bandwidth filter especially for fading channel conditions. While using a very low bandwidth filter or in other words, using a lot of data spread over a long duration of time, statistical variance-based noise estimate cannot accurately differentiate noise variations from signal variations due to the Doppler effect.

Figure 4:
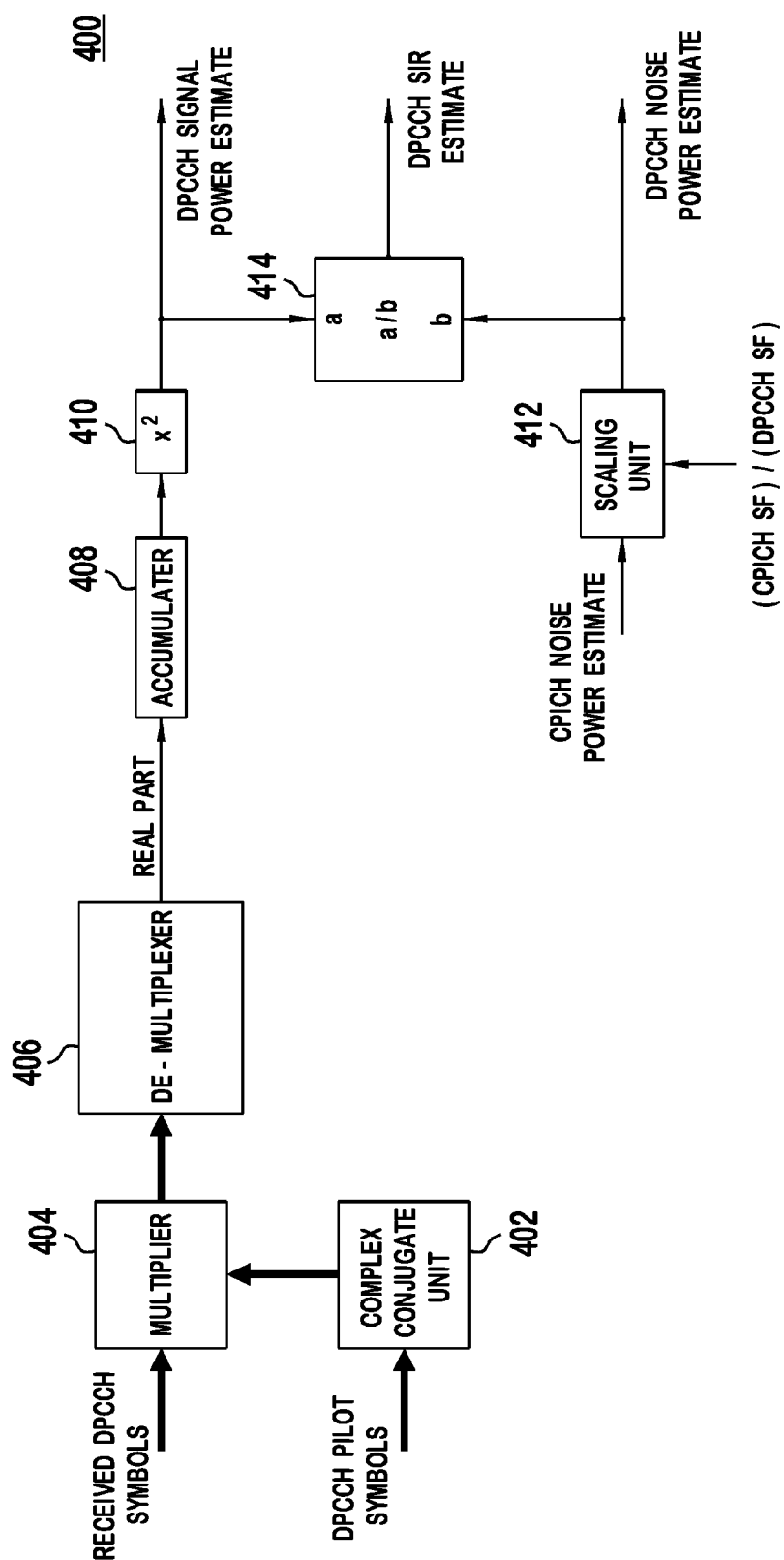
FIG. 4 is a block diagram of an example apparatus for estimating a DPCCH SIR in accordance with another embodiment.

FIG. 4 is a block diagram of an example apparatus 400 for estimating a DPCCH SIR in accordance with a second embodiment. In a WCDMA system, an accurate estimate of the DPCCH SIR per time slot is required for efficient power control operation. However, the number of DPCCH pilot symbols available to make the SIR estimate is limited leading to a larger variance in the SIR estimate. The method described below alleviates this problem by making use of the CPICH noise estimate to measure the DPCCH SIR per time slot.

In a WCDMA system, a CPICH is continuously transmitted all the time, which may be used to make reliable estimates of its signal and noise estimates using the first embodiment disclosed above. Assuming the availability of reliable channel estimates, it may be shown that the noise observed on channels of different spreading factors scales inversely to their respective spreading factors. This fact is exploited to make more accurate estimate of the DPCCH SIR.

The apparatus 400 includes a complex conjugate unit 402, a multiplier 404, a de-multiplexer 406, an accumulator 408, a power calculation unit 410, a scaling unit 412, and a divider 414. The apparatus 400 receives a DPCCH pilot symbol sequence. The DPCCH pilot symbols are QPSK modulated and may be represented in complex notation with real and imaginary components representing the projections of the received signal onto the two basis functions defined by Equation (2). All the signal energy of the DPCCH pilot symbols may be transformed onto the real axis by multiplying the received DPCCH pilot symbol sequence with the complex conjugate of the DPCCH pilot symbol sequence.

A complex conjugate of the DPCCH pilot symbols, (i.e., unit phasor), is generated by the complex conjugate unit 402 and multiplied to the received DPCCH pilot symbols by the multiplier 404. A real part and an imaginary part are then separate from the multiplication results by the de-multiplexer 406.

After the transformation the DPCCH signal energy is concentrated on the real part. The real part values may be accumulated by the accumulator 408 and the accumulated value is squared by the power calculation unit 410 to compute a DPCCH signal power estimate.

A CPICH noise power estimate may be estimated using the process 200 disclosed above or any other methods. The CPICH noise power estimate is scaled by the scaling unit 412 with a scaling factor of the ratio of the spreading factor of DPCCH and the spreading factor of the CPICH. The DPCCH SIR estimate is obtained by the divider 414 by dividing the DPCCH signal power estimate by the scaled CPICH noise power estimate.

Figure 5:
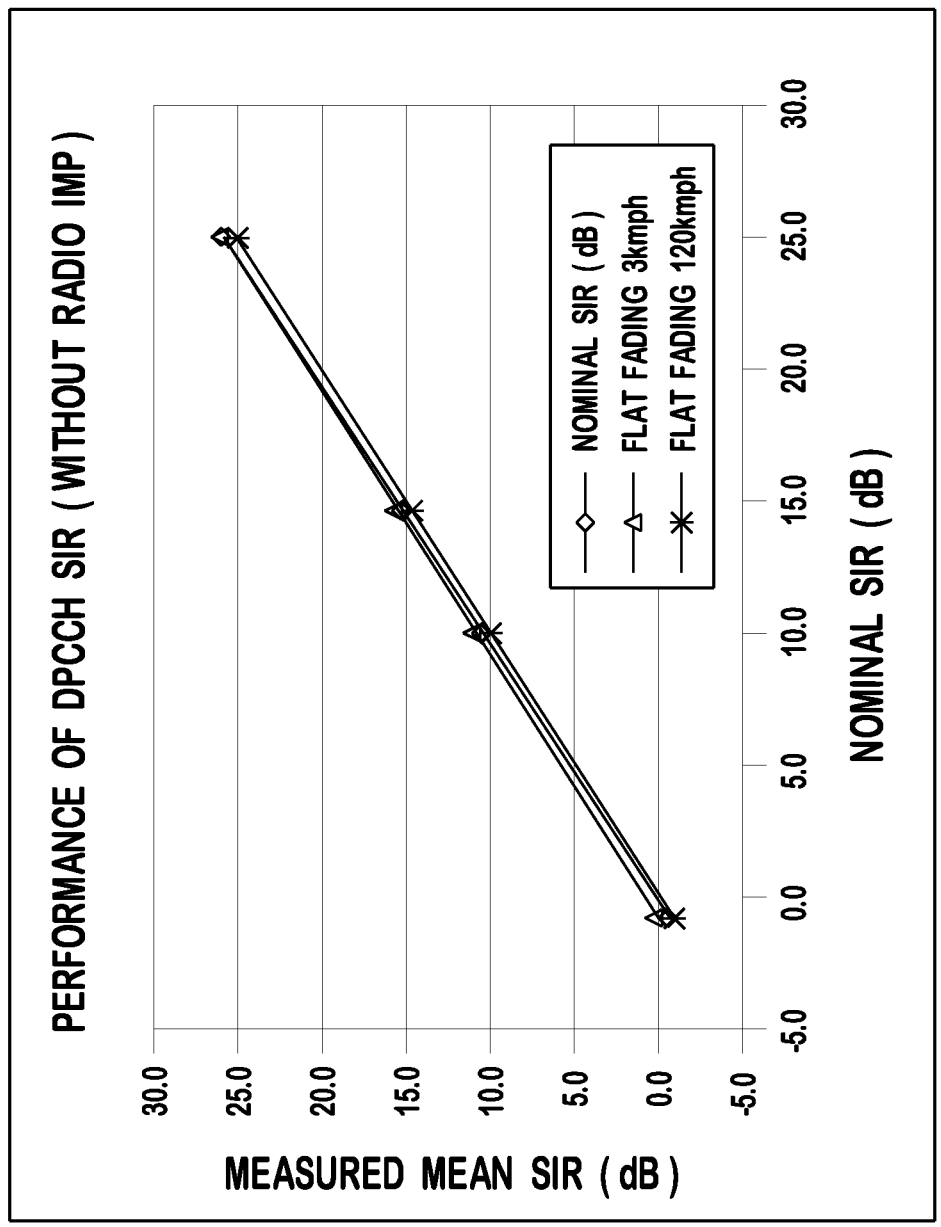
FIG. 5 shows the performance of DPCCH SIR estimation using the CPICH noise estimate in accordance with a second embodiment.

FIG. 5 shows the performance of DPCCH SIR estimation using the CPICH noise estimate in accordance with the second embodiment. The results have been generated using a single pole exponentially weighted moving average (EWMA) filter for CPICH noise estimate with pole at 0.975. It is observed that the results show good agreement over a broad range of SIR scenarios.

The DPCCH SIR estimation using the CPICH noise estimate would yield an accurate estimate when both the CPICH and the DPCCH are using the same scrambling code. However, the DPCCH may be on a different scrambling code. In this case, it is more appropriate to use the noise power estimate measured using DPCCH pilot symbols. The DPCCH noise estimate may be estimated using the first embodiment above.

One of the main advantages of the embodiments is that signal energy and noise energy may be measured independently of each other. This allows usage of a very low bandwidth filter to improve the accuracy of the final estimate. By having a separate filter for signal and noise measurements, the bandwidth of the two filters may be independently controlled, so that each of the filters is tuned according to their rate of variations. For example, in a code division multiple access (CDMA) system, noise and interference vary much slowly than the signal, which is subject to Doppler. Therefore a lower bandwidth filter may be used for the noise measurement to yield better estimates.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of estimating signal power, the method comprising:
   receiving a first signal, wherein the first signal carries modulated symbols and includes noise;
   transforming symbol energy of the first signal to a real part and noise energy of the first signal to an imaginary part by multiplying the first signal with a complex conjugate of a second signal, wherein the second signal is a pilot signal that is a priori known and represents the first signal uncorrupted by noise and the second signal has a real component and an imaginary component; and
   computing signal power from the real part of the first signal after the transformation.

2. The method of claim 1 wherein the second signal is an estimate of the first signal.

3. The method of claim 1 wherein the computing signal power from the real part of the first signal after the transformation includes filtering the real part of the first signal after the transformation and computing the signal power from the filtered real part of the first signal after the transformation.

4. The method of claim 1 wherein the first signal is received over a common pilot channel (CPICH), or a dedicated physical control channel (DPCCH).

5. The method of claim 1 wherein the symbols are modulated according to pulse amplitude modulation (PAM), or M-phase shift keying (MPSK).

6. The method of claim 1 wherein the modulated symbols are capable of being represented in complex notation having a real component and an imaginary component and the first signal is capable of being represented in complex notation having a real component and an imaginary component.

7. A method of estimating noise power, the method comprising:
   receiving a first signal, wherein the first signal carries modulated symbols and includes noise;
   transforming symbol energy of the first signal to a real part and noise energy of the first signal to an imaginary part by multiplying the first signal with a complex conjugate of a second signal, wherein the second signal is a pilot signal that is a priori known and represents the first signal uncorrupted by noise and the second signal has a real component and an imaginary component; and
   computing noise power from the imaginary part of the first signal after the transformation.

8. The method of claim 7 wherein the second signal is an estimate of the first signal.

9. The method of claim 7 wherein the modulated symbols are capable of being represented in complex notation having a real component and an imaginary component and the first signal is capable of being represented in complex notation having a real component and an imaginary component.

10. The method of claim 9 wherein on a condition that the noise is identically distributed between real component of the first signal and the imaginary component of the first signal, the computing noise power from the imaginary part of the first signal after the transformation includes squaring the imaginary part of the first signal after the transformation and scaling by a factor of two the squared imaginary part of the first signal after the transformation and filtering the scaled imaginary part of the first signal after the transformation.

11. The method of claim 7 wherein the symbols are modulated according to pulse amplitude modulation (PAM), or M-phase shift keying (MPSK).

12. An apparatus for estimating signal power, the apparatus comprising:
   a receiver configured to receive a first signal, wherein the first signal carries modulated symbols and includes noise;
   a computation unit configured to transform symbol energy of the first signal to a real part and noise energy of the first signal to an imaginary part by multiplying the first signal with a complex conjugate of a second signal, wherein the second signal is a pilot signal that is a priori known and represents the first signal uncorrupted by noise and the second signal has a real component and an imaginary component; and
   a power computation unit configured to compute signal power from the real part of the first signal after the transformation.

13. The apparatus of claim 12 wherein the second signal is an estimate of the first signal.

14. The apparatus of claim 12 wherein the power computation unit is configured to filter the real part of the first signal after the transformation and compute the signal power from the filtered real part of the first signal after the transformation.

15. The apparatus of claim 12 wherein the first signal is received over a common pilot channel (CPICH), or a dedicated physical control channel (DPCCH).

16. The apparatus of claim 12 wherein the symbols are modulated according to pulse amplitude modulation (PAM), or M-phase shift keying (MPSK).

17. The apparatus of claim 12 wherein the modulated symbols are capable of being represented in complex notation having a real component and an imaginary component and the first signal is capable of being represented in complex notation having a real component and an imaginary component.

18. An apparatus for estimating noise power, the apparatus comprising:
   a receiver configured to receive a first signal, wherein the first signal carries modulated symbols and includes noise;
   a computation unit configured to transform symbol energy of the first signal to a real part and noise energy of the first signal to an imaginary part by multiplying the first signal with a complex conjugate of a second signal, wherein the second signal is a pilot signal that is a priori known and represents the first signal uncorrupted by noise and the second signal has a real component and an imaginary component; and
   a power computation unit configured to compute noise power from the imaginary part of the first signal after the transformation.

19. The apparatus of claim 18 wherein the second signal is an estimate of the first signal.

20. The apparatus of claim 18 wherein the modulated symbols are capable of being represented in complex notation having a real component and an imaginary component and the first signal is capable of being represented in complex notation having a real component and an imaginary component.

21. The apparatus of claim 20 wherein the power computation unit is configured to, on a condition that the noise is identically distributed between real component of the first signal and the imaginary component of the first signal, compute noise power from the imaginary part of the first signal after the transformation by squaring the imaginary part of the first signal after the transformation and scaling by a factor of two the squared imaginary part of the first signal after the transformation and filtering the scaled imaginary part of the first signal after the transformation.

22. The apparatus of claim 18 wherein the symbols are modulated according to pulse amplitude modulation (PAM), or M-phase shift keying (MPSK).

* * * * *